United States Patent [19]

Messersmith et al.

[11] Patent Number: 4,611,696

[45] Date of Patent: Sep. 16, 1986

[54] BRAKE CONTROL DEVICE

[75] Inventors: William K. Messersmith; Lloyd G. Bach, both of South Bend, Ind.

[73] Assignee: Allied Corporation, Morristown, N.J.

[21] Appl. No.: 726,838

[22] Filed: Apr. 24, 1985

[51] Int. Cl.⁴ .............................................. B60K 41/24
[52] U.S. Cl. .................................. 192/13 A; 192/3 H
[58] Field of Search ............. 192/3 H, 13 A; 188/177, 188/178

[56] References Cited

U.S. PATENT DOCUMENTS

| | | | |
|---|---|---|---|
| 2,762,476 | 9/1956 | Gaylord et al. | 192/3 H |
| 3,498,426 | 3/1970 | Nakano | 192/13 A |
| 4,533,028 | 8/1985 | Taig | 192/3 H X |
| 4,538,710 | 9/1985 | Taig | 192/3 H X |

FOREIGN PATENT DOCUMENTS 2144187 2/1985 United Kingdom ............. 192/13 A

Primary Examiner—Rodney H. Bonck
Assistant Examiner—Alan G. Towner
Attorney, Agent, or Firm—Larry J. Palguta; Ken C. Decker

[57] ABSTRACT

A brake control device (20) is disposed between a brake pedal (12) and a clutch pedal (10) to retain the brake pedal (12) in an applied position when the clutch pedal (10) is depressed and the vehicle is facing downhill on an incline and in reverse gear, so that the vehicle operator may remove his foot from the brake pedal (12). A control circuit (110) includes a backup light switch (114) and attitude switch (116) for operating a solenoid actuator (120) that applies a locking ball (28) of the brake control device (20). A brake control device (320) may be operated by a solenoid actuator (325) controlled by an electronic control unit (340) so that the brake pedal (12) is retained in an applied position whenever the vehicle is stationary and the clutch pedal (10) depressed.

12 Claims, 3 Drawing Figures

BRAKE CONTROL DEVICE

The present invention relates to an improved brake control device wherein a vehicle with a clutch pedal and a brake pedal includes a locking device to retain the brake pedal in an applied position when the clutch pedal is depressed and the vehicle disposed on an incline, so that the vehicle operator may remove his foot from the brake pedal. The improved brake control device may be operated to effect retention of the brake pedal when the vehicle is disposed on a downhill incline, or may comprise a device which is not directly connected to the clutch pedal but is operated by a solenoid actuator controlled by an electronic control unit.

In U.S. Pat. Nos. 4,533,028 and 4,538,710, and Application Ser. No. 596,178; and co-pending Patent Application Ser. No. 706,210 entitled "DISABLING DEVICE FOR A BRAKE CONTROL DEVICE", Inventor: Alistair G. Taig, each incorporated by reference herein, a brake control device has been disclosed which automatically prevents the vehicle from rolling backwards down an incline when the clutch pedal is depressed and the vehicle operator's foot has been moved after a brake application to an accelerator pedal. Thereafter, when the clutch pedal is released, the brake control device simultaneously releases the brake pedal so that the vehicle is free to continue moving up the incline as the vehicle operator accelerates the vehicle. The brake control device includes a connecting member which moves with the brake pedal on each brake application, and the connecting member is carried by the housing in a manner that permits effortless movement by the connecting member while reducing the noise or chatter associated with the movement thereof. Also, the brake control device includes a electromagnetic coil for effecting a reverse gear lockout of a locking ball device.

Co-pending application entitled "DISABLING DEVICE FOR BRAKE CONTROL DEVICE" of Alistair G. Taig, describes two circumstances where it is desirable to prevent the brake control device from operating. The first instance comprises the situation when the vehicle is disposed on a downhill incline and the operator wishes to operate the vehicle in reverse gear down the incline, with the result that the locking ball device will move to an operative position. It is desriable that the brake control device not operate when the vehicle is being operated in reverse gear down an incline. Also, if the vehicle is being operated in reverse gear and is disposed on level ground, a sudden stop or deceleration would cause the ball to operate in the same manner as if the vehicle were disposed on an uphill incline. The prior Application proposed a solution by providing an electromagnetic coil for retaining the locking ball device in an inoperative position when the vehicle is operating in reverse gear, or a wire-operated mechanism which prevents the linkage assembly from operating when the clutch pedal is depressed.

It is also desirable to provide the feature of retaining the brake pedal in the applied position when the vehicle is facing downhill and the vehicle operator wishes to back up the hill. In other words, it is desirable to have the brake control device operate in order to retain the brake pedal at the end of a reverse movement up a downhill slope.

The present invention comprises an improved brake control device wherein the vehicle includes a brake pedal and a clutch pedal, the brake control device comprising a housing fixedly disposed relative to the vehicle and defining an opening therein, a connecting member carried within the opening and operatively coupled to the brake pedal, a linkage assembly extending into the opening the operatively coupled to the clutch pedal, locking means at least partially carried within the opening to automatically lock the connecting member to the housing when the clutch pedal is depressed and the vehicle is disposed on an incline, the locking means comprising a ball and an inclined ramp upon which the ball is disposed, electromagnetic means for selectively preventing said locking means from automatically locking the connecting member to the housing, the housing including at least one cover closing one end of the opening and the one cover including a pair of integral and flexible fingers extending into the opening to resiliently support the connecting member for movement in the opening, characterized in that said locking means includes solenoid means coupled to control circuit means for energizing said solenoid which displaces said ball into engagement with the connecting member and housing when the clutch pedal is depressed and the vehicle disposed on a predetermined incline. The control circuit means includes an attitude responsive switch operatively coupled to a backup light circuit on the vehicle so that the attitude responsive switch closes when the vehicle is facing downhill and movement of the vehicle in reverse gear effects energization of the solenoid means to cause displacement of the ball into a locking position.

An alternative embodiment provides an improved brake control device which operates responsively to an electronic control unit which energizes a solenoid actuator that displaces the linkage assembly coupled to the brake control device. In this embodiment, the brake control dervice is not connected to the clutch pedal, but the electronic control unit receives input from a clutch position switch in order to determine when to activate the solenoid actuator and displace the linkage. The brake control device includes a connecting member carried within an opening in the housing and which is operatively coupled to the brake pedal, locking means carried within the opening to automatically lock the connecting member to the housing, a linkage assembly extending into the opening and for engaging the locking means, characterized in that the brake control device includes actuator means operatively coupled to the linkage means and control circuit means for selectively operating said actuator means and operatively coupled linkage assembly, the locking means including a ball biased by resilient means into engagement with said linkage assembly so that when said control circuit means selectively operates said actuator means, a resulting operation of the linkage assembly permits said ball to automatically lock the connecting member to the housing. This brake control device operates automatically whenever the clutch is depressed and the vehicle is stationary, without regard to the position or attitude of the vehicle. Thus, when the brake pedal is depressed by the vehicle operator, the brake pedal will be retained until either the clutch pedal is released or the vehicle begins to move. The brake control device is not vehicle-attitude sensitive, and therefore, provides for retention of the brake pedal regardless of the attitude of the vehicle.

The invention is described in detail with reference to the drawings which illustrate the embodiments, in which.

Figure 1:
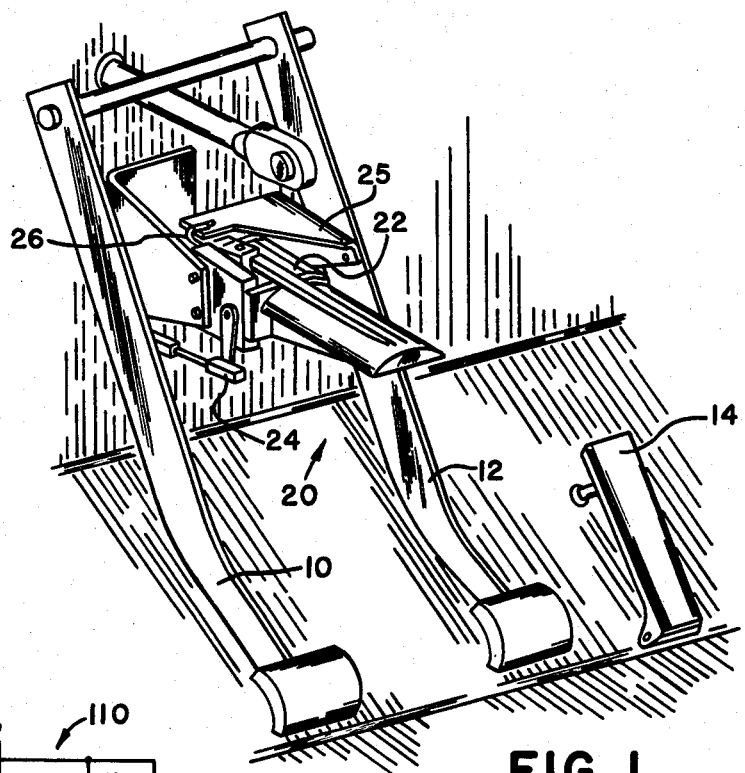
FIG. 1 is a perspective view of the arrangement for a clutch pedal, a brake pedal and accelerator of the vehicle which is equipped with a brake control device.
Figure 2:
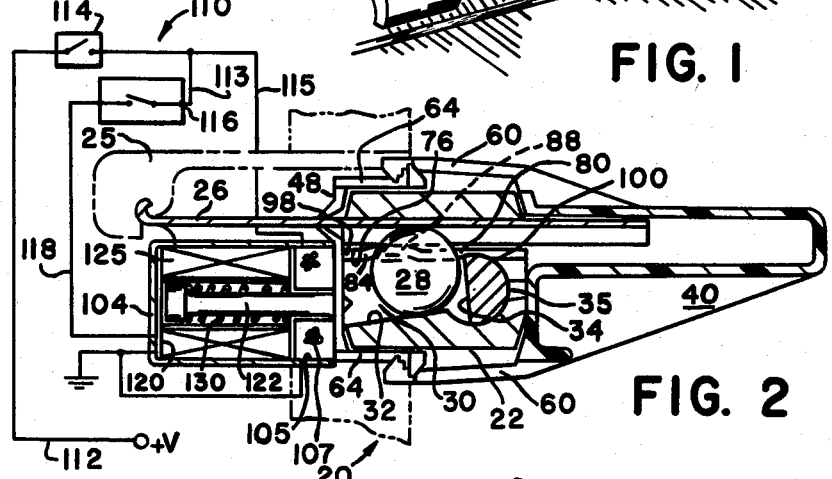
FIG. 2 is a cross-sectional view of the brake control device and associated brake control circuit.

Referring to FIGS. 1 and 2, a vehicle equipped with a standard transmission includes a clutch pedal 10 operable to disengage the transmission from the motor to allow shifting of gears in the transmission. A brake pedal 12 is operable to control actuation of the vehicle brake system, and an accelerator pedal 14 controls the vehicle speed. If the vehicle is stopped on an incline, the vehicle operator will normally position one foot on the clutch pedal to disengage the transmission and other foot on the brake pedal to hold the vehicle stationary on the incline. When it is time to continue up the incline, the foot on the brake pedal must be moved to the accelerator to increase the engine speed, at the same time the clutch pedal is returned to its rest position. For vehicles with foot-operated parking brakes, synchronized release of the parking brake and clutch also may require a degree of driver skill. Both procedures are awkward at times because the vehicle immediately tends to move backward once the foot on the brake pedal is separated therefrom to release the brake system. In order to overcome this predicament, a brake control device 20 is mounted on the vehicle typically between the brake pedal 12 and the clutch pedal 10. The brake control device includes a housing 22 fixed relative to the vehicle, the linkage assembly 24 coupled to the clutch pedal 10 and a connecting member 26 coupled to the brake pedal via bracket 25. The brake control device 20 is constructed in accordance with the brake control device disclosed in co-pending U.S. Application Ser. No. 596,178 incorporated by reference herein.

As shown in FIG. 2, a ball 28 is movably disposed within the housing 22 in an opening 30 extending therethrough. The surface 32 formed in the opening is slanted so that when the vehicle is on a flat level surface, the ball 28 will remain at one end of the opening and spaced from the connecting member 26. Conversely, when the vehicle is disposed on an uphill incline, the ball 28 is free to move along the surface 32 into a wedge fit between the connecting member 26 and housing 22, as is shown in FIG. 2 which illustrates the brake in the applied position so that a cam 34 permits the ball 28 to move into locking position between the member 26 and surface 32. In order to control operation of the ball 28, the linkage assembly 24 includes the cam 34 extending into opening 30 by means of bore 35 to oppose the ball 28. Because the linkage assembly 24 is coupled to the clutch pedal 10, the cam 34 is movable in response to movement of the clutch pedal from a first position preventing engagement of the ball 28 with both connecting member 26 and housing 22 to a second position (as illustrated in FIG. 2) permitting the ball to engage the housing and connecting member. The cam 34 permits engagement for a wedge fit between ball 28 and connecting member 26 when the clutch pedal is depressed, and prevents engagement for a wedge fit when the clutch pedal is in its rest position. As a result, when the vehicle is stopped on an incline the pedal 12 will remain applied via operation of the brake control device and only when the clutch pedal 10 is depressed.

The housing includes a first cover 40 closing one end of the opening 30 and a second cover 48 through which the connecting member extends outwardly of the housing. In order to couple the covers together, the covers form a pair of arms 60 for cover 40 and a pair of arms 64 for cover 48. Arms 60 cooperate with arms 64 to define a releasable latch permitting the arms to be snapped together and lock cover 40 to cover 48.

A pair of shoulders 76 are formed in the housing 22 and provide a rest for a pair of fingers 80. The first cover 40 includes a pair of integral and spaced-apart flexible fingers 80 which extend into opening 30, FIG. 2 illustrating one of flexible finger disposed behind the movable ball 28. Rigid portions 84 of the fingers 80 engage the shoulders 76 to locate the fingers in the opening 30, and flexible portions 88 extend arcuately in a longitudinal direction on each side of the ball 28 to slidably engage connecting member 26 at the edges thereof. Consequently, the fingers 80 resiliently retain the connecting member for sliding engagement through the housing 22.

The second cover 48 is provided with tabs 98 extending into the opening 30 to engage shoulders 76 and locate the second cover relative to opening 30, in addition to opposing the fingers 80 to prevent the fingers from flattening out against shoulder 76 in response to lateral movement of the connecting member 26.

The cam 34 is provided with a pair of annular slots 100 for receiving rigid portions 84 of fingers 80 so that the fingers prevent the cam from separating from housing 22 after covers 40 and 48 are snapped together.

The housing cover 48 includes a cavity 105 which has an electromagnetic coil 107 disposed therein. The electromagnetic coil has terminal attachments (not shown) which connect it to an appropriately controlled power source.

When the vehicle is being operated in reverse, the circuit 110 which includes lines 112 and 115 with backup light switch 114, permits the energization of coil 107. Energization of electromagnetic coil 107 causes ball 28 to move against cover 48. Whenever the vehicle is shifted into reverse gear, electromagnetic coil 107 operates in response thereto and maintains the ball in an inoperative position. Thus, when the vehicle is operating in reverse, the device 20 will be disabled so that there will not be a retention of the brake pedal when the vehicle operator comes to a stop. This is in accordance with the reverse gear lockout device disclosed in the co-pending patent application entitled "DISABLING DEVICE FOR A BRAKE CONTROL DEVICE" by Alistair G. Taig. Cover 48 includes a solenoid actuator 120, described below, and energization of coil 107 is insufficient to operate actuator 120.

Also, it is desirable to have the brake control device 20 operate when the vehicle operator is operating the vehicle on a downhill incline. Operation of the brake control device would permit the brake pedal to be retained in the applied position and maintain the vehicle in a stationary position when it is facing downhill, even when the vehicle is in reverse gear. Thus, if the operator is backing up a downhill slope and stops the vehicle, the brake control device will operate and maintain the vehicle operator's position so that the vehicle will not roll forward, until either the clutch pedal or brake pedal are released. Housing cover 48 includes therein the solenoid actuator 120 having coil 125 and armature 122. Circuit lines 113 and 118 include an attitude switch 116 which is normally open but which closes when the vehicle is facing downhill. When the vehicle is facing downhill, switch 116 will close the shifting into reverse gear closes switch 114 to complete the circuit lines 112-113-118 so that the solenoid coil 125 of actuator 120 is energized and causes solenoid armature 122 to be displaced to the right in FIG. 2. Solenoid armature 122 is biased by spring 130 away from movable ball 28, and energization of coil 125 causes the armature to move to the right and stroke movable ball 28 toward a locked position between housing 22 and connecting member 26. Thus, when the vehicle operator has the vehicle in reverse gear, disposed on a downhill slope, and the vehicle has come to a stop because the brake pedal 12 is depressed so that connecting member 26 is extended as shown in FIG. 2, and clutch pedal 10 is depressed so that cam 34 is rotated as illustrated, solenoid armature 122 strokes ball 28 into locking position to retain the brake pedal 12 in the applied position, despite the vehicle being disposed on a downhill slope. Normally, the movable ball would not move into locking position if the vehicle is disposed on a downhill incline because the force of gravity would displace the ball 28 down inclined surface 32. Only a reverse acceleration and an excessively sudden stop would cause the movable ball 28 to move into a locking position, and then, possibly, it would not be retained therein.

Figure 3:
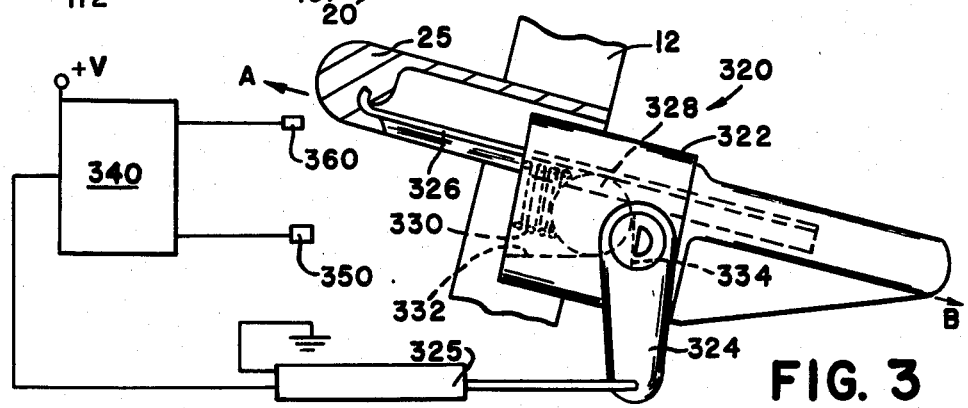
FIG. 3 is a side view of the alternative embodiment of the brake control device operatively coupled to the solenoid actuator and electronic control unit.

FIG. 3 illustrates an alternative embodiment which provides a brake control device 320 that operates responsively to an electronic control unit or ECU 340 without regard to the attitude or position of the vehicle. The brake control device 320 is constructed in accordance with the previously described brake control device 20 and is shown with solenoid 325 activated, except that the device does not have an electromagnetic coil 107 and solenoid actuator 120, but includes therein a spring 330 which continuously biases the movable ball 328 toward a locking position between the incline surface 332 and the connecting member 326. Instead of linkage arm 324 being connected to the clutch pedal of the vehicle, arm 324 is connected to a solenoid actuator 325 operated by electronic control unit 340. The ECU receives input signals from a speed control sensor 350 and a clutch position switch 360.

When the vehicle is moving, the speed control sensor 350 generates an electrical signal to ECU 340 which prevents solenoid actuator 325 from being operated. Likewise, clutch position switch 360 provides an electrical input to ECU 340 so that ECU 340 will provide an electrical output to operate solenoid actuator 325 when the clutch position switch input indicates that the clutch pedal is depressed and the speed control sensor does not sense any vehicle speed and therefore does not provide an electrical input to ECU 340. Thus, brake control device 320 will be operated by solenoid actuator 325 whenever the vehicle is stationary and the clutch pedal is depressed. Operation of solenoid actuator 325 displaces arm 324 to rotate cam 334 (as illustrated) so that the ball 328 may be pressed into locking position between incline 332 and connecting member 326. The brake pedal cannot be retained until it is depressed. The clutch position input comprises a variable in the logic circuit of ECU 340 so that depression of the clutch pedal and disposition of the vehicle in a stationary position will allow solenoid actuator 325 to be operated and permit the ball 328 to be placed in a locking position, but there will be no actual retention of the brake pedal until and unless the vehicle operator depresses the brake pedal. The brake pedal will be retained in the applied position until either (1) the clutch is released, or (2) the vehicle moves. The clutch position switch and speed control sensor operate in conjunction with ECU 340 to cause solenoid actuator 325 to be deactivated and return arm 324 to an inactive position and cause ball 328 to be displaced by cam 334 from the locking position.

Brake control device 320 provides for retention of the brake pedal during appropriate circumstances, despite the attitude of the vehicle i.e., uphill, downhill, or flat surface. Speed control sensor 350 insures that brake control device 320 will not operate until the vehicle has come to a stop, at which time brake control device 320 may be operated. It should be clear that when the clutch pedal is depressed and vehicle stationary, so that solenoid actuator 325 operates and displaces arm 324 to permit ball 328 to move to a locking position, the depression of the brake pedal to extend connecting member 326 in the direction of Arrow A is permitted because connecting member 326 displaces the ball slightly against spring 330. There is no locking effected until the operator moves his foot from the brake pedal whereupon connecting member 326 would move slightly in the direction of Arrow B and ball 328 becomes wedged between incline surface 332 and connecting member 326, and thereby retain connecting member 326 in a fixed position.

Under circumstances when no electrical power is supplied to ECU 340, cam 334 urges ball 328 from engagement to preclude retention of brake pedal 12.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

We claim:

1. An improved brake control device wherein the vehicle includes a brake pedal and a clutch pedal, the brake control device comprising a housing fixedly disposed relative to the vehicle and defining an opening therein, a connecting member carried within the opening and operatively coupled to the brake pedal, a linkage assembly extending into the opening and operatively coupled to the clutch pedal, locking means at least partially carried within the opening to automatically lock the connecting member to the housing when the clutch pedal is depressed and the vehicle is disposed on an incline, said locking means comprising a ball and an inclined ramp upon which the ball is disposed, and electromagnetic means for selectively preventing said locking means from automatically locking the connecting member to the housing, characterized in that said locking means further includes actuator means coupled to control circuit means for energizing said actuator means which displaces said ball into engagement with the connecting member and housing when the clutch pedal is depressed and the vehicle disposed on a predetermined incline.

2. The improved brake control device in accordance with claim 1, characterized in that said control circuit means comprises an attitude responsive switch operatively coupled to a backup light switch of the vehicle so that the attitude responsive switch closes when the vehicle is facing downhill and placing the vehicle in reverse gear effects operatively the energization of said actuator means to cause the displacement of said ball.

3. The improved brake control device in accordance with claim 1, wherein the actuator means comprises solenoid means with resilient means for biasing an armature of the solenoid means.

4. The improved brake control device in accordance with claim 3, wherein the resilient means biases the armature away from said ball.

5. The improved brake control device in accordance with claim 1, wherein an armature of the actuator means is displaced through said electromagnetic means when the actuator means is energized.

6. The improved brake control device in accordance with claim 5, wherein the housing includes at least one cover closing one end of the opening and the one cover including a pair of integral and flexible fingers extending into the opening to resiliently support the connecting member for movement in the opening.

7. A brake control device wherein a vehicle includes a brake pedal and a clutch pedal, the brake control device comprising a housing fixedly disposed relative to the vehicle and defining an opening therein, a connecting member carried within the opening and operatively coupled to the brake pedal, locking means carried within the opening to automatically lock the connecting member to the housing, and a linkage assembly extending into the opening for engaging said locking means, characterized in that the device includes actuator means operatively coupled to said linkage assembly and control circuit means for selectively operating said actuator means and operatively coupled linkage assembly, the locking means including a ball biased by resilient means into engagement with said linkage assembly so that when said control circuit means selectively operates said actuator means a resulting operation of the linkage assembly permits said ball to automatically lock the connecting member to the housing when said brake pedal is depressed.

8. The brake control device in accordance with claim 7, characterized in that said control circuit means operates responsively to clutch pedal position and speed of the vehicle.

9. The brake control device in accordance with claim 7, characterized in that said linkage assembly includes a cam engaging said ball, the operation of the linkage assembly rotating said cam to permit said ball to engage the connecting member and housing for locking therebetween.

10. The brake control device in accordance with claim 8, wherein the depression of the brake pedal displaces the operatively coupled connecting member against said ball which moves slightly to permit the displacement of the connecting member.

11. The brake control device in accordance with claim 10, wherein the ball is wedge-fitted between the connecting member and housing to lock the connecting member to the housing and retain the brake pedal in a depressed position.

12. The brake control device in accordance with claim 9, wherein the ball is biased continuously into engagement with said cam.

* * * * *